United States Patent Office 3,748,298
Patented July 24, 1973

3,748,298
AROMATIC-OXALIC POLYHYDRAZIDES AND
SOLUTIONS THEREOF
Frank Dobinson, Gulf Breeze, and Chris A. Pelezo, Pensacola, Fla., assignors to Monsanto Company, St. Louis, Mo.
No Drawing. Filed Sept. 29, 1971, Ser. No. 184,911
Int. Cl. C08g 33/04, 51/44
U.S. Cl. 260—32.6 NA                                        8 Claims

ABSTRACT OF THE DISCLOSURE

Film- and fiber-forming solutions of high-molecular-weight, linear polyhydrazides dissolved in N,N-dimethyl acetamide solvent containing dissolved inorganic halide are provided. The polyhydrazides contain recurring structural units:

(A)
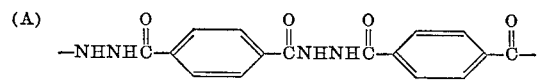

and (B)
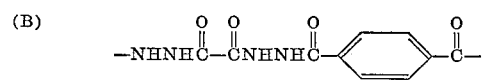

in a ratio between 1:9 and 9:1 and are prepared in dimethyl acetamide containing dissolved, e.g., lithium chloride by polymerizing therein appropriate amounts of reactants which include terephthaloyl chloride, terephthalic dihydrazide and oxalic dihydrazide. The resulting solutions may be extruded into fibers or cast into films by conventional solution spinning and casting. Fibers produced from these solutions have very high values of tensile strength and modulus, and are particularly useful in reinforcing rubber and plastic articles.

---

This invention relates to novel spinning solutions comprised of terephthalic-oxalic polyhydrazides dissolved in N,N-dimethylacetamide containing dissolved inorganic halide and to fibers and films prepared therefrom.

DESCRIPTION OF THE PRIOR ART

Spinning solutions comprised of aromatic polyhydrazides dissolved in dimethyl sulfoxide or dimethyl sulfoxide containing dissolved lithium chloride are described in Frazer U.S. 3,130,182; 3,130,183; and 3,536,651. According to the teachings of these patents the spinning solutions are prepared in two stages. In the first stage the polyhydrazide is prepared by a low-temperature solution polymerization technique in which the polyhydrazide-forming monomers are combined and reacted in either N-methylpyrrolidone or hexamethylphosphoramide containing a small amount of dissolved lithium chloride, as solvent. In the second stage the resulting polyhydrazide is isolated from the polymerization solvent and dissolved in either dimethyl sulfoxide or dimethyl sulfoxide containing dissolved lithium chloride to provide the spinning solution.

The polyhydrazides described in the patents have the recurring structural unit:

(A)

or (B)

wherein —Ar$_1$— and —Ar$_2$— are individually selected from the group consisting of m-phenylene and p-phenylene radicals and —Ar— represents a divalent aromatic radical with the proviso that less than 65 mol percent of the radicals are para-oriented. Polyhydrazides of the foregoing type have limited solubility and are increasingly less soluble as the para-phenylene content thereof increases. When high modulus fibers are to be prepared from the polyhydrazides, it is desirable to obtain as high a percentage of para-phenylene radicals as possible. For this reason these polyhydrazides are prepared in dilute solution, then isolated therefrom and dissolved in a more powerful solvent, i.e. dimethyl sulfoxide, for purposes of providing a suitable spinning solution. Dimethyl sulfoxide cannot be used as a polymerization solvent because acid chlorides in dimethyl sulfoxide are very unstable. Also, due to the limited solubility of these polyhydrazides, high-molecular-weight polyhydrazides of this type having more than about 80 mol percent of the phenylene radicals thereof oriented in the para-position have heretofore not been obtainable, e.g., polyhydrazides having an inherent viscosity above about 3.0.

An object of the present invention is to provide spinning solution comprising high-molecular-weight aromatic polyhydrazides wherein the aromatic portion thereof consists of phenylene radicals of which at least 80 mol percent are para-oriented, dissolved in N,N-dimethylacetamide containing dissolved inorganic halide and fibers extruded therefrom.

Another object of the invention is to provide said solutions by a combined process whereby the polyhydrazide-forming monomers are simply polymerized in N,N-dimethylacetamide containing dissolved inorganic halide and wherein no intermediate isolation of the polyhydrazide is involved, i.e. N,N-dimethylacetamide functions both as the polymerization solvent and as the spinning solvent.

SUMMARY OF THE INVENTION

The foregoing and other objects of the invention are accomplished by combining and reacting in N,N-dimethylacetamide containing 1 to 10 weight percent dissolved inorganic halide, e.g. lithium chloride, substantially equimolar amounts of terephthaloyl chloride and a mixture of dihydrazides consisting of terephthalic dihydrazide and oxalic dihydrazide in a molar ratio ranging from 1:9 to 9:1 with a range of 2:3 to 3:2 being particularly preferred. The reaction is conducted at a temperature between about —20° and 30° C. with continual stirring of the reaction mixture. A polymer gel is formed which is converted to a clear spinning solution (dope) by vigorous stirring thereof. If desired, a small amount of water may be added to the gel. Preferably, a small amount of an inorganic base, e.g. lithium hydroxide hydrate, is added to the gel to neutralize the hydrogen chloride formed during polymerization.

The polyhydrazides in solution have an inherent viscosity of at least 3.0 and preferably at least 6.0, e.g. 6.0 to 10.0. The inherent viscosities ($\eta_{inh}$) are measured at 25° C. on a concentration (C) of 0.5 gram of polymer per 100 ml. of solvent, N,N-dimethylacetamide containing 5 percent by weight of lithium chloride, the solutions being prepared by dilution of the spinning dopes. This technique must be used in determining the inherent viscosities of the polyhydrazides of the present invention since, once the polyhydrazides are isolated from the N,N-dimethylacetamide solutions thereof, they will not then dissolve in solvent, including dimethyl sulfoxide containing lithium chloride. $\eta_{inh}$ is determined by the equation:

$$\eta_{inh} = \frac{\ln(\eta_{rel})}{C}$$

where $\eta_{rel}$ is the relative viscosity as determined on a capillary viscometer.

The polyhydrazides of the present invention are characterized by the recurring structural units:

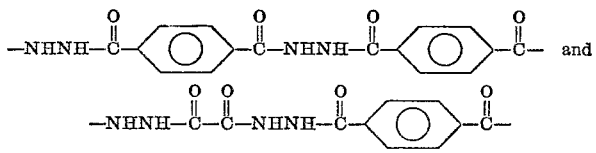

in a molar ratio between 1:9 to 9:1 with a range of from 2:3 to 3:2 being preferred. The polymer concentration of the spinning solutions of the present invention generally range from 4 to 10 weight percent.

It was quite surprising and unexpected to discover that the polyhydrazides of the present invention could be prepared by the combined method just described. Attempts to prepare the polyhydrazide having the recurring structural unit,

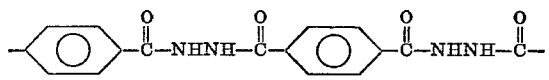

or the recurring structural unit

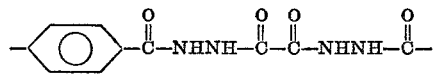

by the same method were unsuccessful; only low-molecular-weight insoluble polymer was obtained. On the other hand, the polyhydrazides of the present invention surprisingly cannot be prepared according to the method described in the cited Frazer patents for the reason that once the polyhydrazide is isolated from the polymerization solvent it is virtually insoluble.

The clear polyhydrazide spinning solution of the present invention may be spun and processed into fibers having high tensile strength and modulus value according to conventional solution spinning techniques, such as those described in U.S. Pat. 3,414,645.

The invention is further illustrated by the following examples in which inherent viscosities were determined as described previously. Fiber properties were measured on Instron equipment and are given as T/E/M, where T and M represent tenacity at break and initial modulus, respectively, expressed in grams per denier (g.p.d.) and E represents elongation at break, expressed as a percentage (percent).

DESCRIPTION OF THE PREFERRED EMBODIMENTS

Example I

Lithium chloride (5.7 grams) was dissolved in dry N,N-dimethylacetamide (1144 ml.) in a three-liter resin kettle fitted with a downwardly driven helical stirrer attached to a high-torque, high-speed motor. Terephthalic dihydrazide (19.4 grams 0.1 M) and oxalic dihydrazide (11.8 grams, 0.1 M) were dissolved in the warm solvent (DMAc/LiCl); then the solution was cooled to 0° C. Terephthaloyl chloride (40.6 grams, 0.2 M) was added to the stirred (400 r.p.m.) reaction mixture. After about 20 minutes, an extremely viscous dope had formed and the speed of the stirrer had slowed to about 150 r.p.m. Lithium hydroxide hydrate (10 grams) and 5 ml. of water were added to the viscous dope with continued stirring to provide a clear solution containing about 5 wt. percent polymer having an inherent viscosity of 8.1.

Example II

This example illustrates the preparation of fibers from the spinning solution prepared in Example I.

The spinning solution of Example I was placed in a hollow, stainless-steel spinning vessel. Fibers were extruded from a spinneret having 10 holes each of 8-mil diameter, through a half-inch air gap and into an aqueous spin bath. After an immersion path of about 20 inches, well-collapsed filaments were drawn from the bath and passed several times around a pair of Godet rolls partially immersed in 25% aqueous N,N-dimethylacetamide (DMAc). The speed of these rolls was adjusted so that the rate of wind-up was 1.2 times greater than the theoretical jet speed; the jet speed was calculated from the speed at which polymer solution is pumped from the vessel and from the number and size of the spinneret orifices. The stretch imparted to the filaments in this manner is called the "jet-stretch." The resulting clear bright filaments next passed through a 30-inch bath of hot water (90° C.) under no tension; the washed filaments were wound on a second pair of rolls which was immersed in warm water (50° C.) and moving at the same speed as the first pair of rolls. The filaments were then dried by passing them several times around a pair of steam-heated Godet rolls. Next, the filaments passed over an electrically heated metal shoe heated to 250° C., during which a further stretching (hot-stretch) of 2.74 times was performed. The hot-stretched filaments then passed through a 12-inch tube, blanketed with nitrogen and heated at its center to 420° C. During this step the fibers were stretched by a factor of 1.05. The properties of the resulting fiber (T/E/M) were: 15.0 g.p.d./6.4%/434 g.p.d., respectively.

Example III

Terephthalic dihydrazide (11.64 g., 0.060 M), oxalic dihydrazide (1.77 g., 0.015 M) and 400 ml. of dry DMAc containing 5% (weight to volume, w./v.) of lithium chloride were mixed in a two-liter resin kettle fitted with a double-helix stirrer and a high-torque motor. The slurry was heated to 50° C. to form a clear solution that remained clear when cooled to 0° C. by means of an ice-bath. Next, terephthaloyl chloride (15.225 g., 0.075 M) was added all at once and rapid stirring (400 r.p.m.) was started. After 20 minutes an extremely viscous dope had formed, during which time the speed of the stirring had slowed to about 150 r.p.m. Stirring was continued and lithium hydroxide hydrate (5.0 g.) dissolved in DMAc containing a little water (5 ml.) was added to the dope to neutralize the major portion of the hydrochloric acid formed during polymerization. The resulting clear polymer solution contained polymer having an inherent viscosity of 8.3. The polymer solution was spun into fibers and the fibers were washed according to the procedure of Example II. The washed fibers were dried by passing them several times around a pair of steam-heated Godet rolls. Then, the fibers were passed over an electrically heated metal shoe maintained at 325° C. and further stretched (hot-stretched) 1.8 times. Tensile properties, T/E/M, of the fibers were measured and were found to be: 8.4 g.p.d./3.1%/410 g.p.d.

Example IV

In a 3-liter resin kettle, terephthalic dihydrazide (19.4 g., 0.1 M), oxalic dihydrazide (11.8 g., 0.1 M) and terephthaloyl chloride (40.6 g., 0.2 M) were reacted in DMAc/LiCl (1430 ml.) according to the procedure of Example III only this time the initial speed of the double helix stirrer was 600 r.p.m. After 15 minutes a viscous dope had formed and the hydrochloric acid was then neutralized by addition of 16.8 g. of lithium hydroxide hydrate and 11 ml. of water to the dope. A clear dope containing 4 wt. percent polymer solids was produced; inherent viscosity of the polymer was 9.6. Fibers were spun from the dope as described in Example IV, with the exception that in this instance the jet-stretch was 1.5 and the hot-stretch was 2.2 times over a shoe held at 315° C. Fiber properties (T/E/M) were determined and found to be 13.9 g.p.d./4.6%/417 g.p.d.

Example V

Lithium chloride (4381 g.) was dissolved in dry DMAc (80 liters) in a glass-lined reactor fitted with a double-helix stirrer. Terephthalic dihydrazide (1751 g., 9.04 M) and oxalic dihydrazide (1065 g., 9.03 M) were dissolved in the warm solvent, then the solution was cooled to 0° C. Terephthaloyl chloride (3664 g., 18.05 M) was added to the stirred (80 r.p.m.) reaction mixture. At the end of two hours' reaction time, lithium hydroxide (865 g., 36 M) slurried in a mixture of water (1750 ml.) and DMAc (5300 ml.) was added to neutralize the HCl formed during polymerization. The resulting viscous dope (15,000 poise at 25° C.) contained polymer having an inherent viscosity of 7.2.

Fibers were spun from this dope through a spinneret of 10 holes each of 8 mil diameter as described in Example II, except that the fibers were stretched over hot shoes in two stretching zones. The spinning conditions were as follows:

"Jet stretch": ×3.0.
First hot stretch: ×2.5 at 275° C.
Second hot stretch: ×1.2 at 350° C.

The resulting fibers had a tenacity of 15.6 g.p.d., an elongation at break of 5.1%, and an initial modulus of 483 g.p.d.

Example VI

The procedure of Example I was repeated. The polymer was precipitated from the resulting solution by pouring the solution into water. The polymer was then washed with alcohol and dried. The polymer would not dissolve in either DMAc/LiCl solvent or in dimethyl sulfoxide/LiCl solvent.

Example VII

This example illustrates that a 5 wt. percent DMAc/LiCl solution of the polyhydrazide consisting of recurring structural units

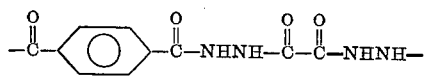

or recurring structural units

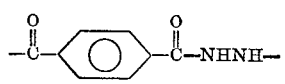

cannot be prepared by the low temperature solution polymerization method described in the prior art.

Lithium chloride (3.3 grams) was dissolved in dry DMAc (675 ml.) in a three-liter resin kettle fitted with a Teflon stirrer attached to a small motor by means of a glass rod. Oxalic dihydrazide (11.8 grams, 0.1 M) was dissolved in the warm solvent, then the solution was cooled to 0° C. Terephthaloyl chloride (20.3 grams, 0.1 M) was added to the stirred (80 r.p.m.) reaction mixture. Low-molecular-weight polymer rapidly precipitated forming a useless paste.

The above procedure was repeated with the exception that terephthalic dihydrazide (19.4 grams, 0.1 M) was used instead of oxalic dihydrazide. Again, only a low-molecular-weight polymer in the form of a useless paste was formed.

In view of these results it was indeed surprising that spinning solutions of terephthalic-oxalic polyhydrazides can be prepared by the combined method described herein.

Examples I–V illustrate the preferred embodiments of the invention. However, the scope of the invention is not limited thereto. For example, it is contemplated that in preparing the polyhydrazides of the invention up to 10 mole percent of the terephthaloyl chloride reactant may be replaced with another diacyl or disulfonyl halide, such as isophthaloyl chloride. Also, while it is intended that at least 90 mole percent of the dihydrazide reactant consists of oxalic dihydrazide and terephthalic dihydrazide in a mole ratio of from 9:1 to 1:9, it is contemplated that the remainder thereof (≤ 10 mole percent) may consist of other dihydrazides, diamines or mixtures thereof, such as isophthalic dihydrazide, 1,4- or 1,3-diaminobenzene, 1,4- or 1,3-diaminocyclohexane, etc. Also, instead of using lithium chloride to enhance the solvent power of DMAc other inorganic halides may be used, e.g., lithium bromide, calcium bromide, calcium chloride magnesium chloride and the like. Additionally, minor amounts of conventional polymer additives may be incorporated into the polyhydrazides, such as heat and light stabilizers, viscosity stabilizers, antistatic agents, flame retardants and the like.

We claim:

1. A high molecular weight, film- and fiber-forming polyhydrazide formed by the condensation of substantially equimolar amounts of
  (A) a diacyl halide or disulfonyl halide reactant and
  (B) a mixture of dihydrazides,
wherein at least 90 mole percent of said diacyl or disulfonyl halide reactant consists of terephthaloyl chloride and at least 90 mole percent of said mixture of dihydrazides consists of terephthalic dihydrazide and oxalic dihydrazide in a mole ratio of from 1:9 to 9:1, said polyhydrazide having an inherent viscosity of at least 3.0 when measured at 25° C. at a concentration of 0.5 gram of polymer per 100 ml. of N,N-dimethylacetamide containing 5 percent by weight of lithium chloride.

2. A high molecular weight, film- and fiber-forming polyhydrazide consisting essentially of the following recurring structural units:

A) 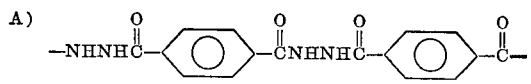

and (B) 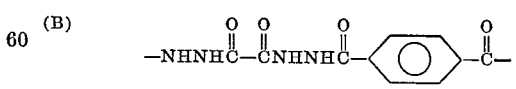

wherein the mole ratio of (A) units to (B) units is from 1:9 to 9:1, said polyhydrazide having an inherent viscosity of at least 3.0 when measured at 25° C. at a concentration of 0.5 gram of polymer per 100 ml. of N,N-dimethylacetamide containing 5 percent by weight of lithium chloride.

3. The polymer of claim 2 wherein the ratio of (A) units to (B) units is from 2:3 to 3:2.

4. Film- and fiber-forming solution comprising (1) N,N-dimethylacetamide, (2) from about 4 to about 10 percent by weight, based on the weight of the solution, of a linear polyhydrazide consisting essentially of at least 80 mole percent of recurring units of the formula (A) 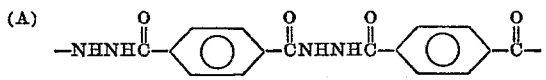

and (B) 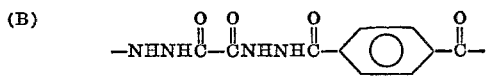

in a mole ratio of from 1:9 to 9:1, said polyhydrazide having an inherent viscosity of at least 3.0 when measured at 25° C. at a concentration of 0.5 gram of polymer per 100 ml. of N,N-dimethylacetamide containing 5 percen by weight of lithium chloride, and (3) from about 1 to about 10 percent, based on the weight of N,N-dimethylacetamide, of inorganic halide.

5. The solution of claim 4 wherein the inorganic halide is lithium chloride.

6. The solution of claim 4 wherein the polyhydrazide consists essentially of recurring units (A) and (B).

7. The solution of claim 6 wherein the polyhydrazide consists essentially of recurring units (A) and (B) in a mole ratio of from 3:2 to 2:3.

8. A filament of the polyhydrazide defined in claim 1.

References Cited
UNITED STATES PATENTS

| | | | |
|---|---|---|---|
| 3,130,183 | 4/1964 | Frazer | 260—78 |
| 3,130,182 | 4/1964 | Frazer | 260—78 |
| 3,642,707 | 2/1972 | Frazer | 260—78 TF |
| 3,536,651 | 10/1970 | Frazer | 260—30.8 |
| 3,632,548 | 1/1972 | Duston | 260—32.6 N |

MORRIS LIEBMAN, Primary Examiner

R. ZAITLEN, Assistant Examiner

U.S. Cl. X.R.

260—32.6 NT, 78 TF